US007902310B2

(12) United States Patent
Einfeldt et al.

(10) Patent No.: US 7,902,310 B2
(45) Date of Patent: Mar. 8, 2011

(54) COPOLYMERS BASED ON PHOSPHOROUS-CONTAINING MONOMERS, METHODS FOR THE PRODUCTION THEREOF AND THEIR USE

(75) Inventors: Lars Einfeldt, Jena (DE); Alexander Kraus, Evenhausen (DE); Gerhard Albrecht, Tacherting (DE); Martina Brandl, Traunstein (DE); Angelika Hartl, Tacherting (DE)

(73) Assignee: Construction Research & Technology GmbH, Trostberg (DE)

( * ) Notice: Subject to any disclaimer, the term of this patent is extended or adjusted under 35 U.S.C. 154(b) by 459 days.

(21) Appl. No.: 11/920,194

(22) PCT Filed: May 17, 2006

(86) PCT No.: PCT/EP2006/004691
§ 371 (c)(1),
(2), (4) Date: Dec. 17, 2007

(87) PCT Pub. No.: WO2006/122793
PCT Pub. Date: Nov. 23, 2006

(65) Prior Publication Data
US 2008/0125520 A1     May 29, 2008

(30) Foreign Application Priority Data

May 18, 2005 (DE) .......................... 10 2005 022 843

(51) Int. Cl.
*C04B 24/26* (2006.01)
(52) U.S. Cl. ............. 526/221; 526/229; 526/274; 524/5
(58) Field of Classification Search .................. 526/221, 526/229, 274; 524/5
See application file for complete search history.

(56) References Cited

U.S. PATENT DOCUMENTS

| | | |
|---|---|---|
| 3,562,166 A | 2/1971 | Nicholson et al. |
| 5,109,090 A | 4/1992 | Mongoin et al. |
| 5,110,358 A | 5/1992 | Mongoin et al. |
| 5,147,506 A | 9/1992 | Mongoin et al. |
| 6,008,275 A | 12/1999 | Moreau et al. |
| 6,211,317 B1 | 4/2001 | Albrecht et al. |
| 6,777,517 B1 | 8/2004 | Albrecht et al. |
| 2001/0012864 A1 | 8/2001 | Satoh et al. |

FOREIGN PATENT DOCUMENTS

| | | |
|---|---|---|
| DE | 198 34 173 A1 | 2/1999 |
| DE | 100 56 849 A1 | 5/2001 |
| EP | 0 074 708 A2 | 3/1983 |
| EP | 0 117 429 A1 | 9/1984 |
| EP | 1 110 981 A | 6/2001 |
| FR | 2 637 511 | 4/1990 |
| JP | 48 0 23 808 B4 | 7/1973 |
| JP | 60 0 78 993 A | 5/1985 |
| JP | 02 17 47 787 A | 7/1990 |
| JP | 09 3 09 755 A | 12/1997 |
| JP | 2001146450 A | 5/2001 |
| WO | WO 92/22289 | 12/1992 |
| WO | WO 00/77058 A | 12/2000 |
| WO | WO 01/58579 A | 8/2001 |
| WO | WO 2004/024647 A1 | 3/2004 |
| WO | WO 2004/076376 A2 | 9/2004 |
| WO | WO 2005/019288 A | 3/2005 |
| WO | WO 2005/019288 A1 | 3/2005 |

OTHER PUBLICATIONS

The Role of Steric Repulsive Force in the Dispersion of Cement Particles in Fresh Paste Prepared with Organic Admixtures, Uchikawa, Cement & Concrete Research (1997) (Abstract).
Dicarboxylic Acids Link Proton Transfer Across a Liquid Membrane to the Synthesis of Acyl Phosphates. A Model for P-Type H+ ATPases, Colton, et al.—Journ. Of Organic Chem. (1994) (Abstract).
Preparation of Biotinylated and FITC-labelled phosphorylchlorine poly(acrylamide) derivatives and their application for protein ligand-binding studies, Liberda, et al. Dept. Biochemistry. (1999) Abstract.

*Primary Examiner* — Robert D. Harlan
(74) *Attorney, Agent, or Firm* — Fulbright & Jaworski L.L.P.

(57) ABSTRACT

The invention relates to copolymers based on phosphorous-containing monomers (A) and on macromonomers (B), to methods for the production thereof and to their use as additives for inorganic binding agent suspensions based on cement, lime, gypsum and anhydrite. The corresponding polymeric additives have, as flow agents, excellent water-reducing properties and hold the flowability of the concrete over a relatively long period of time (60 to 90 min.) to an almost unchanged level without having delayed action. In addition, the corresponding polymeric additives improve the processing and setting processes of the building materials produced with these additives by making possible earlier and higher resistances to pressure.

21 Claims, No Drawings

COPOLYMERS BASED ON PHOSPHOROUS-CONTAINING MONOMERS, METHODS FOR THE PRODUCTION THEREOF AND THEIR USE

This application is a §371 of PCT/EP2006/004691 filed May 17, 2006, which claims priority from German Patent Application No: 10 2005 022 843.7 filed May 18, 2005.

The present invention relates to copolymers based on phosphorus-containing monomers, processes for their preparation and the use thereof as admixtures for inorganic binder suspensions based on cement, lime, gypsum and anhydrite.

According to a widely accepted theory, the effectiveness of superplasticizers for cement-containing binder suspensions is based substantially on two effects. Thus, the negatively charged acid groups of the superplasticizers are adsorbed on the cement particle surface positively charged by calcium ions. The resulting electrostatic double layer (Zeta potential) leads to electrostatic repulsion between the particles. The repulsive forces caused by the Zeta potentials, however, have only short ranges [cf. H. Uchikawa, "Cem. Concr. Res." 27 (1997) 37-50]. However, the adsorption of the superplasticizer also prevents the surfaces of the cement particles from coming into direct contact with one another. With the use of corresponding comb polymers, this steric repulsion effect is drastically increased by the non-adsorbed side chains [cf. K. Yoshioka, "J. Am. Ceram. Soc." 80 (1997) 2667-71]. It is obvious that the sterically caused repulsion effect can be influenced both by the length of the side chains and by the number of side chains per main chain. On the other hand, an excessively high side chain density or length can hinder the adsorption on the cement particle surface.

On the basis of this knowledge, a large number of superplasticizers based on polyethercarboxylates were developed in the last 10 years (WO 99/47 468 A1, WO 97/00 898 A1, EP 1 437 330 A1, EP 0 924 174 A1, EP 0 850 894 A1, EP 0 838 444 A1, EP 0 870 784 A1, EP 0 753 488 A1, U.S. Pat. No. 6,267,814 B1, U.S. Pat. No. 5,707,445 B1, U.S. Pat. No. 5,703,174 B1, DE 199 26 611 A1, DE 198 34 173 A1, DE 195 13 126 A1).

The comb-like copolymers comprising poly(alkylene glycol)-containing acrylates/methacrylates are distinguished in that a random distribution of the individual monomers along the polymer chain is present. However, such a distribution along the polymer backbone does not rule out the more or less frequent existence (as a result of polymerization) of domains which are based on homopolymers of one or other monomer (or further monomers). In other words, strictly alternating copolymers are not obtainable by this method, so that greater or lesser non-uniformity of these copolymers is always present.

These comb-like copolymers corresponding to the prior art have good water-reducing properties in aqueous mineral binder suspensions, but a flowability of the concrete can be kept at a constant level with these copolymers only over a comparatively short period.

It was therefore the object of the present invention to develop copolymers based on phosphorus-containing monomers and the use thereof as admixtures for inorganic binder suspensions, the corresponding copolymers not having said disadvantages corresponding to the prior art but, as superplasticizers, both having good water-reducing properties (without impairing the plasticization of, for example, the concrete) and keeping the flowability of the concrete at a virtually unchanged level over as long a period as possible (60-90 min) without having a retarding effect (so-called slump retainer).

This object was achieved, according to the invention, by using copolymers based on phosphorus-containing monomers (A) of the formulae (Ia) and/or (Ib) and macromonomers (B) of the general formula (II) as claimed in claim 1.

It has in fact surprisingly been found that the corresponding copolymers are very suitable as admixtures for mineral binder suspensions, it being possible for these admixtures to be used both as excellent superplasticizers and/or as slump retainers. In addition, the corresponding polymeric admixtures improve the processing and hardening processes of the building materials produced using these admixtures, by permitting earlier and higher compressive strengths.

The copolymers according to the invention are derived from phosphorus-containing monomers (A) and macromonomers (B). The phosphorus-containing monomers (A) correspond to the general formulae (Ia) or (Ib)

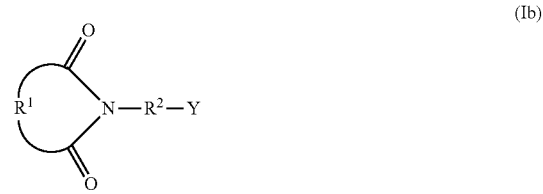

where

R$^1$ =

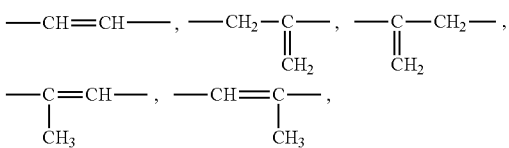

X=O, S, NH, N—R$^2$—Y,

R$^2$=C$_1$-C$_{20}$-(hetero)alkylene radicals optionally having O or N heteroatoms, which are linear or branched and optionally also have 1 to 10 substituents selected from the group consisting of OH, OPO$_3$M$_2$, OPHO$_2$M, NH$_2$, NH—CH$_2$PO$_3$M$_2$, N(CH$_2$—PO$_3$M$_2$)$_2$, CZ(PO$_3$M$_2$)$_2$, and C$_6$-C$_{10}$-arylene radicals,

Y=—N(CH$_2$—PO$_3$M$_2$)$_2$, —CZ(PO$_3$M$_2$)$_2$, —OPHO$_2$M, —OPO$_3$M$_2$,

Z=H, Hal, OH, NH$_2$,

Hal=F, Cl, Br, I,

M=H, Na, K, NH$_4$, N(R$^3$)$_4$,

R$^3$=C$_1$-C$_{12}$-alkyl radicals, preferably C$_1$-C$_8$-alkyl radicals, and C$_6$-C$_{10}$-aryl radicals.

The corresponding monomers (A) firstly consist of an electron-poor vinylic bond based on maleic acid, itaconic acid or citraconic acid derivatives and secondly have a phosphorus-containing anionic radical based on phosphonate-, phosphite- or phosphate-containing groups.

According to the general formula (Ia), these are the monoesters (X=O, S) or monoamides (X=HN, N—R$^2$—Y) of the corresponding dicarboxylic acid derivatives or, according to the formula (Ib), the corresponding cyclic imides.

The phosphorus-containing anionic radicals are bonded to the unsaturated dicarboxylic acid derivatives via suitable (hetero)alkylene or arylene spacers (for example $R^2$).

The relevant radicals $R^2$ are $C_1$-$C_{20}$-alkylene or heteroalkylene radicals (having O or N heteroatoms), which may be linear or branched, or are $C_6$-$C_{10}$-arylene radicals (such as, for example, phenylene or naphthylene). In a preferred embodiment, they are $C_1$-$C_{10}$-alkylene or heteroalkylene radicals.

The $C_1$-$C_{20}$- or $C_1$-$C_{10}$-(hetero) alkylene radicals may optionally also have 1 to 10 substituents selected from the group consisting of OH, $OPO_3M_2$, $OPHO_2M$, $NH_2$, $NH$—$CH_2PO_3M_2$, $N(CH_2$—$PO_3M_2)_2$ and $CZ(PO_3M_2)_2$, Z being H, Hal, OH or $NH_2$ and Hal being F, Cl, Br or I and M being H, Na, K, $NH_4$ or $N(R^3)_4$ ($R^3$=$C_1$-$C_{12}$-alkyl radicals and $C_6$-$C_{10}$-aryl radicals).

The monomers (A) can be prepared in a technically very simple manner by allowing unsaturated dicarboxylic acid derivatives of the general formula (VI)

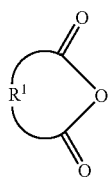

(VI)

to react with phosphorus-containing compounds of the general formula (VII)

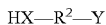

HX—$R^2$—Y                (VII)

($R^1$, $R^2$, X and Y having the abovementioned meaning) at temperatures of from 0 to 100° C., it being possible for this reaction to be carried out both continuously and batchwise.

Maleic acid, itaconic acid and citraconic acid are used as unsaturated dicarboxylic anhydride according to formula (VI).

The phosphonate, phosphite and phosphate building blocks which are presented in formula (VII) are prior art and can be obtained by many variants:
A) Methylphosphonation of amines (U.S. Pat. No. 3,288,846, U.S. Pat. No. 4,235,890).
B) Phosphonation of carboxylic acids and derivatives thereof, such as, for example, acid chlorides, acid amides or nitrites (U.S. Pat. No. 4,239,695, U.S. Pat. No. 4,100,167, U.S. Pat. No. 3,799,758, U.S. Pat. No. 3,400,149, DE 27 45 084, DE 25 34 391, DE 21 30 794, DE 197 37 923, DE 16 18 788, DE 11 48 551).
C) Phosphation of alcohols and ethers (Houben-Weyl, volume E2 (1982), M. Regitz (editor), page 491 et seq., and literature cited therein, SU 178 819, SU 178 374).
D) Phosphites of alcohols and ethers (Houben-Weyl, volume E1 (1982), M. Regitz (editor), page 313 et seq., and literature cited therein, in particular GB 940 697).

However, the solution which is of most interest in terms of process engineering is the phosphation of alcohols (SU 196 817). According to the invention, amino-containing alcohols can also be phosphated by this procedure. Thus, the industrially most important aminoalcohols, such as aminoethanol [CAS 141-43-5], diethanolamine [CAS 111-42-2] or tris(hydroxymethyl)aminomethane (TRIS) [CAS 77-86-1], which were dissolved or suspended with 85% strength phosphoric acid in o-xylene, can be phosphated directly at the hydroxyl group by separating off the water by means of azeotropic distillation on a water separator. However, other commercially available aminoalcohols, such as aminohexanol [CAS 4048-33-3], 2-aminoethoxyethanol [CAS 929-06-6], 4-aminobenzyl alcohol [CAS 623-04-1], N-(2-aminoethyl)diethylenolamine [CAS 3197-06-6], N-(3-aminopropyl)diethanolamine [CAS 4985-85-7], can also be phosphated in this manner with surprisingly high yields (table 1). Owing to the high oxygen affinity of phosphorus, a reaction at the amino group does not take place. The formation of phosphoric acid diesters is likewise negligibly small. The phosphation of aminoalkyl/aryl alcohols with phosphoric acid is generally described (e.g. of aminoethanol, DE 930 566, GB 684 977) but, with the use of virtually equimolar amounts of concentrated phosphoric acid, such a high conversion and such little formation of phosphoric acid diesters are unknown to date (table 1).

TABLE 1

Phosphation of various aminoalcohols in o-xylene at room temperature

| Starting material (aminoalcohol) | $H_3PO_4$ | Degree of phosphation[a][b] |
|---|---|---|
| Aminoethanol (AE) | 1.1 eq. | 93 ± 2% |
| 2-aminoethoxyethanol (AEE) | 1.1 eq. | 87 ± 6% |
| Aminohexanol (AH) | 1.1 eq. | 80 ± 1% |
| 4-Aminobenzyl alcohol (ABA) | 1.1 eq. | ~90%[c] |
| Diethanolamine (DEA) | 2.2 eq. | 93% |
| N-(3-aminopropyl)diethanolamine (APDEA) | 2.2 eq. | 92% |
| Tris(hydroxymethyl)aminomethane (TRIS) | 3.2 eq. | 86 + 1% |

[a]Degree of phosphation (DP) = percentage amount of phosphated hydroxyl groups
[b]The determination of the DP was effected with the aid of 1H-NMR ($D_2O$).
[c]The DP was determined by means of HPLC.

The coupling of these phosphorus-containing compounds to vinyl-containing anhydrides—for example of maleic acid, itaconic acid or citraconic acid—is effected in particular via an esterification or amidation. The presence of at least one "free" NH, SH or OH function in these phosphorus-containing compounds corresponding to formula (VII) (X=O, S, N) is required for this purpose.

The reaction of the dicarboxylic anhydrides according to formula (II) with the phosphorus-containing compounds according to formula (III) is preferably effected in aqueous solution or in a mixture of water and a $C_1$-$C_4$-alcohol or water and acetone. The pH is preferably kept at <pH 7 during the reaction. Under these conditions, no secondary reactions, such as, for example, Michael addition of the NH group at the vinylic double bond of the acid anhydride, are observed.

Depending on the reactivity of the NH, SH or OH function in these phosphorus-containing compounds, it is possible to employ an equimolar amount or a (small) excess of acid anhydride. In principle, any base or alkali can be used for pH control. However, NaOH, KOH, ammonia or other amines are preferred.

The high conversions in the coupling of the phosphorus-containing compounds to vinylic anhydrides are summarized in table 2 for the example of the amidation of maleic anhydride (MAA) with phosphated aminoalcohols.

TABLE 2

Amidation of MAA with various phosphated aminoalcohols in H$_2$O

| Molar composition of the starting materials | | Product composition (yield) | | |
|---|---|---|---|---|
| Phosphated aminoalcohol (1.0 eq.) | MAA content | Amides[a][b] (total) | Phosphorus-containing amides[c] | Starting material[d] (amines) |
| Aminoethanol phosphate | 1.0 eq. | 85 ± 1% | 58-79% | 15 ± 1% |
| Aminoethanol phosphate | 1.1-1.2 eq. | 98 ± 1% | 90-92% | ~1% |
| (2-Aminoethoxy)ethanol phosphate | 1.2 eq. | 91 ± 5% | n.d.[e] | 9 ± 5% |
| Aminohexanol phosphate | 2.0 eq. | 93% | 74% | 7% |
| N-(3-Aminopropyl)di-ethanolamine phosphate | 1.5 eq. | 91% | n.d.[e] | 9% |
| Diethanolamine diphosphate | 1.0 eq. | 82 ± 8% | 50-83% | 18 ± 8% |
| Diethanolamine diphosphate | 2.0-2.5 eq. | 95 ± 4% | 90-96% | 5 ± 4% |

[a]The determination of the total content of MA-amide was effected by 1H-NMR (D$_2$O).
[b]The content is composed of phosphorus-containing MA-amide and amide of MA + aminoalcohol.
[c]Proportion of the phosphorus-containing MA-amide of the total content of MA-amide.
[d]Proportion of the "free" amines: unconverted phosphated aminoalcohols + aminoalcohol residues.
[e]n.d. = not determinable since it is not possible to distinguish between phosphorus-containing amide and the amide of residual aminoalcohol in this product with the aid of 1H-NMR.

In principle, it is also possible to distinguish between phosphorus-containing maleamide and maleamide from pure aminoalcohol in the products (table 2). The ratio between the two amides is substantially reflected in the degree of phosphation of the aminoalcohols, i.e. the higher the phosphation of the aminoalcohol, the greater is the proportion of phosphorus-containing maleamide.

The preparation of phosphorus-containing maleimides of the general formula (Ib) can be effected by dehydration of the maleamides with acetic anhydride/anhydrous sodium acetate or triethylamine, the corresponding maleimides being obtained with N-substituted hydroxyalkylene compounds. Corresponding syntheses with primary amines and a variety of steric requirements have already been described [Wang "Synth. Commun." 20 (1990), 1607, or Braish & Fox "Synlett" (1992), 979]. However, other effective methods—for example with the use of corresponding alkyl-/arylammonium sulfates or phosphates of the alkyl-/arylamines as catalysts [EP 0 257 831, Kita & Kishino "Catalysis Surveys" 2 (1998), 187] or with the use of ion exchangers (U.S. Pat. No. 4,812,579)—are also known.

Furthermore, these maleimide derivatives may also be produced under very mild conditions if maleamide is reacted beforehand by a Diels-Alder reaction with furan to give the so-called maleamide-furan adducts. In this way, it is possible to prepare the N-hydroxyethylmaleimide [CAS 1585-90-6] in very pure, crystalline form, for example using aminoethanol (FR 2 031 538, WO 98/07 759, WO 01/68 601). However, other N-hydroxyalkyl-/arylmaleimides can also be prepared with the aid of this furan protective group (US 2004 014,933).

Thereafter, such N-hydroxyalkyl-/arylmaleimides can be reacted analogously to known methods with phosphoric acid or its anhydrides to give corresponding phosphates (Houben-Weyl, volume E2 (1982), M. Regitz (editor), page 491 et seq.) or with phosphorous acid or its anhydrides to give the phosphites (Houben-Weyl, volume E1 (1982), M. Regitz (editor), page 313 et seq.) and can thus act as phosphorus-containing monomers. Since the phosphorus-containing monomers (A) have a predominantly electron-poor functionality, they require in particular electron-rich comonomers as polymerization partners.

According to the present invention, comonomers used are macromonomers (B) of the general formula (II), which have polyalkylene oxide structures:

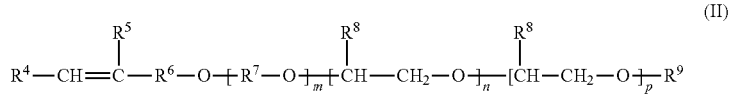

(II)

where
R$^4$=H, C$_1$-C$_{20}$-alkyl radicals, preferably C$_1$-C$_{10}$-alkyl radicals,
R$^5$=H, CH$_3$,
R$^6$=alkylene radicals having 0 to 20 C atoms, preferably having 0 to 10 C atoms,
R$^7$=C$_1$-C$_{20}$-alkylene radicals, preferably C$_1$-C$_{10}$-alkylene radicals,
R$^8$=H, C$_1$-C$_{20}$-alkyl radicals, preferably C$_1$-C$_{10}$-alkylene radicals,
R$^9$=H, C$_1$-C$_{20}$-alkyl radicals, preferably C$_1$-C$_{10}$-alkylene radicals, C$_6$-C$_{10}$-aryl radicals, COR$^3$, NO$_2$M, SO$_3$M, PO$_3$M$_2$,
m=from 0 to 10, preferably from 0 to 5,
n=from 1 to 300, preferably from 1 to 150,
p=from 0 to 300, preferably from 0 to 150, and
R$^3$ and M having the abovementioned meaning.

The macromonomers (B) are in particular vinyl or allyl ethers of polyalkylene oxides, where ethylene oxide, propylene oxide and butylene oxide are preferably to be regarded as alkylene oxide units. Here, the corresponding polyalkylene oxide compounds may be random copolymers or block copolymers.

The poly(alkylene oxide)-like macromonomers (B) are substantially the corresponding side chains in the admixtures used according to the invention. The side chain length may vary due to the molecular weight of the poly(alkylene oxide). Molecular weights (M$_w$) of from 1000 to 2000 g/mol are preferred. Depending on the application as to whether the admixture is to be used in stronger form as a water reducer or as a slump retainer, the chain lengths of the poly(alkylene oxides) may also be substantially increased (e.g. $M_w$~10 000 g/mol) or correspondingly reduced (e.g. $M_w$~500 g/mol). The required properties can also be adjusted by specific mixing of the poly(alkylene oxide)-like macromonomers (B) having different molar masses.

In the case of the polymeric admixtures according to the invention, the molar ratio of phosphorus-containing monomer (A) and macromonomer (B) can be varied within wide limits, but it has proven particularly advantageous to adjust the molar ratio of monomer (A) to monomer (B) in the copolymer to 2:1 to 1:2.

If it is intended to change the charge density on the polymer backbone, it is advantageous that the polymeric admixtures based on the phosphorus-containing monomer (A) and monomer (B) additionally contain building blocks based on the monomers (C) according to the general formulae (IIIa) and/or (IIIb):

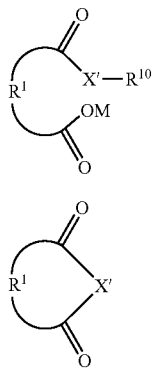

in which

X' is O, S, NH, $NR^{10}$, $R^{10}$ is H, $C_1$-$C_{20}$-(hetero)alkyl radicals optionally having O or N heteroatoms, which are linear or branched and optionally have 1 to 10 OH and/or $NH_2$ groups, and $C_6$-$C_{10}$-aryl radicals and $R^1$ and M have the abovementioned meaning.

Here, in particular N-(hetero)alkyl- or N-arylimides according to formula (IIIb) are used, it also being possible for the alkyl radicals or heteroalkyl radicals (having O or N heteroatoms) to have OH or $NH_2$ groups. According to a preferred embodiment, water-soluble N-hydroxyalkylmaleimides (e.g. hydroxyethylmaleimide) are used here.

It is also possible to influence the charge density originating from the phosphorus-containing anions if the polymeric admixtures also contain monomers (C) according to the general formula (IIIb) in the form of maleic anhydride (X'═O), with the result that the dispersing behavior of the polymeric admixtures is strongly influenced. According to a preferred embodiment, up to 90% of monomer (A) are replaced by monomer (C) in the copolymer based on the monomers (A) and (B).

Instead of the electron-poor monomers (C), it is also possible to use electron-rich monomers (D) of the general formula (IV):

in which $R^{11}$ is H, $R^{10}$, $(CH_2)_rOR^{10}$, $O(C═O)R^{10}$, $R^{12}$, $R^{13}$ are H, $C_1$-$C_{20}$-alkyl radicals, preferably $C_1$-$C_{10}$-alkyl radicals, or $C_6$-$C_{10}$-aryl radicals and r is from 0 to 10 and $R^{10}$ has the abovementioned meaning.

In order to vary the side chain density in the copolymer without changing the charge density on the polymer backbone, in particular alkenyl ethers, esters or alcohols are used here, methyl vinyl ether and hydroxybutyl vinyl ether preferably being used as alkenyl ethers, vinyl acetate as alkenyl esters and allyl alcohol as alkenyl alcohols.

According to a preferred embodiment, the monomer (D) is used in an amount such that up to 90 mol % of the monomer (B) are replaced by the monomer (D) in the copolymer based on the monomers (A) and (B).

According to a further process variant, up to 90 mol % of the monomers (A) and (B) can be replaced by the monomers (C) and (D) in the copolymer based on the monomers (A) and (B).

The copolymers based on the monomers (A), (B) and optionally (C) and (D) are distinguished in that they have a very uniform composition with respect to the monomer composition along their main chain, since they are virtually alternating copolymers. A precondition, however, is that only one electron-poor monomer (C) be reacted with an electron-rich monomer (D).

If, however, corresponding mixtures of electron-rich monomers and mixtures of electron-poor monomers are used, alternating domains which may very strongly influence the properties of the copolymer as a superplasticizer may also occur along the main chain.

It is also possible within the scope of the present invention to incorporate further comonomers (E) according to the general formula (V) into the copolymer based on the monomers (A) and (B) and optionally (C) and (D), which further comonomers (E) are to be regarded neither as electron-poor nor as electron-rich monomers:

in which

W is CN, CO—$R^{14}$, $R^{14}$ is H, OM, $OR^{10}$, $NHR^{10}$, $N(R^{10})_2$, $SR^{10}$ and $R^{10}$, $R^{12}$, $R^{13}$ and M have the abovementioned meaning.

The α,β-unsaturated carboxylic acids (W═CO—$R^{14}$; $R^{14}$═OM), such as, for example, acrylic acid or methacrylic acid, and the water-soluble derivatives thereof, such as, for example, hydroxypropyl acrylate or hydroxyethyl methacrylate, are particularly preferably used here. The copolymer based on the monomers (A), (B) and optionally (C) and (D) preferably contains the monomer (E) in an amount of up to 10 mol equivalents, based on the sum of the monomers (A) and (B) and optionally (C) and (D).

With the use of such comonomers (E), the alternating composition of the copolymers comprising the monomers (A) and (B) and optionally (C) and (D) may be lost, which, however, need not be a disadvantage.

On the contrary, it has been found that the use of the monomers (E) can substantially improve the monomer conversions of (A) and (B) and optionally (C) and (D) (and hence the polymer yields as a whole). Comonomers of the type (E) modify the side chain and charge density of the copolymers and very particularly, when they are used as superplasticizers, can combine the properties of a slump retainer and water reducer in one polymeric admixture.

The polymerization of the phosphorus-containing monomers (A) according to the invention with the comonomers (B) and optionally (C), (D) and (E) is effected in principle by free radical initiation methods which are known to the person skilled in the art in the area of polymerization. The generation of free radicals can be effected either (a) by thermal decomposition of suitable peroxo or azo initiators,
(b) photochemically or
(d) by use of a redox system.

Water-soluble azo initiators, such as, for example, 2,2'-azobis(2-methylpropionamidine) dihydrochloride [CAS 2997-92-4], 2,2'-azobis[2-(2-imidazolin-2-yl)propane] dihydrochloride [CAS 27776-21-2] or 4,4'-azobis[4-cyanopentanoic acid] [CAS 2638-94-0], are preferably used, without their being any claim to completeness. These azo initiators are also distinguished in that higher temperatures (T>60° C.) are required for free radical formation. Polymerizations at room temperature require photochemical excitation for decomposition in the case of such azo initiators.

However, the use of a redox system consisting of hydrogen peroxide, iron(II) sulfate and a reducing agent has proven particularly useful in the initiation of free radical polymerizations in the range T=0-30° C. (fig. 1). Depending on the pH, products from Brüggemann have proven to be useful reducing agents (RA) (e.g. Rongalite®: sodium salt of hydroxymethylsulfonate.2H$_2$O or Brüggolit®: 50-60% of disodium salt of 2-hydroxy-2-sulfinatoacetic acid, 30-35% sodium sulfite, 10-15% of disodium salt of 2-hydroxy-2-sulfonatoacetic acid).

Figure 1:

Initiator system: FeSO$_4$/H$_2$O$_2$/reducing agent (RA)

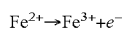

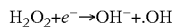

Reducing agent (RA)=Brüggolit® pH 5.0-6.3

In an aqueous system, the polymerization temperatures may be from −10° C. to 100° C. In the case of the photochemical or redox free radical production, the temperatures are preferably from 0° C. to 30° C.

Depending on the reactivity, the monomers can either be completely initially introduced before the beginning of the polymerization or metered in in the course of the polymerization.

The preferred solvent for the polymerization is water. However, it is also possible to use other media (protic or aprotic solvents, melts, supercritical liquids).

The polymeric admixtures proposed according to the invention are outstandingly suitable as superplasticizers (water reducers) or slump retainers for inorganic binder suspensions based on cement, lime, gypsum and anhydrite, it being used in an amount of from 0.01 to 10% by weight, in particular from 0.05 to 5% by weight, based on the weight of the inorganic binder. Here, the polymeric admixture has excellent water-reducing properties and imparts constant flowability to the concrete over a relatively long period.

The following examples are intended to illustrate the invention in more detail.

EXAMPLES

A) General Methods for the Synthesis of Phosphorus-Containing Maleic Anhydride Monomers A.1) Phosphation of Aminoalkyl/Aryl Alcohols with 85% Strength Phosphoric Acid 1.0 mol of the aminoalcohol as an approx. 20% strength solution in o-xylene is stirred with 1.1 mol of 85% strength phosphoric acid and heated under nitrogen until azeotropic distillation of the water occurs. As the reaction progresses, the aminoalkyl/aryl phosphoric acid ester which is insoluble in o-xylene separates out as a viscous, syrupy residue. The reaction is complete when the theoretical amount of H$_2$O has been collected by means of a water separator. The isolation or purification of the product can be effected by two methods: A) After the o-xylene has been decanted, the viscous syrupy product can be converted with H$_2$O/EtOH into a crystalline form. B) With addition of water, the syrupy product can be dissolved and can be separated from the xylene by extraction by shaking. Conversions (degree of phosphation) and analytical data are summarized in table 3.

TABLE 3

Phosphation of various aminoalcohols in o-xylene at ΔT (~140° C.)
(reaction time: until the theoretical amount of H$_2$O was collected)

| Starting material (aminoalcohol) phosphated product | Yield[a] | 1H-NMR (D$_2$O) Chemical shift[b] [δ, ppm] |
|---|---|---|
| Aminoethanol (AE) | 7 ± 2% | 3.70 (t) C$\underline{H}_2$OH, 3.02 (t) C$\underline{H}_2$NH$_2$ (AE); |
| AE phosphate (AEP) | 93 ± 2% | 3.98 (q) C$\underline{H}_2$O—P, 3.16 (t) C$\underline{H}_2$NH$_2$(AEP) |
| (2-aminoethoxy)ethanol (AEE) | 13 ± 6% | 3.51 (t) C$\underline{H}_2$OH, 3.60 (t), 3.56 (t) C$\underline{H}_2$OC$\underline{H}_2$ (AEE); |
| AEE phosphate (AEEP) | 87 ± 6% | 3.87 (sx) C$\underline{H}_2$O—P, 3.07 (t) C$\underline{H}_2$NH$_2$ (AEEP) |
| Aminohexanol (AH) | 19 ± 1% | 3.51 (t) C$\underline{H}_2$OH, 1.6-1.3 (m) C$\underline{H}_2$ (AH); |
| AH phosphates (AHP) | 80 ± 1% | 3.78 (q) C$\underline{H}_2$O—P, 2.91 (t) C$\underline{H}_2$NH$_2$(AHP) |
| Diethanolamine (DEA) | 7 ± 2% | 3.70 (t) C$\underline{H}_2$OH, 3.10 (t), C$\underline{H}_2$NH$_2$ (DEA); |
| DEA diphosphate (DEA-P2) | 93 ± 2% | 4.01 (q) C$\underline{H}_2$O—P, 3.23 (t) C$\underline{H}_2$NH$_2$ (DEA-P2) |
| TRIS[c] [CAS 77-86-1] | 14 ± 1% | 3.69, 3.64, 3.58 (s) C$\underline{H}_2$OH (TRIS); |

TABLE 3-continued

Phosphation of various aminoalcohols in o-xylene at ΔT (~140° C.)
(reaction time: until the theoretical amount of H₂O was collected)

| Starting material (aminoalcohol) phosphated product | Yield[a] | 1H-NMR (D₂O) Chemical shift[b] [δ, ppm] |
|---|---|---|
| TRIS triphosphate (TRIS-P3) | 86 ± 1% | 4.02 (t, 66%), 3.97 (dd, 28%), 3.91 (dd, 6%) C$\underline{H}_2$O—P |

[a]The yield corresponds to the degree of phosphation (DP) and was determined with the aid of 1H-NMR (D₂O). The residual aminoalcohol was not separated from the phosphated product.
[b]The phosphation of the OH groups shows a typical deep field shift of the proton signal C$\underline{H}_2$O—P compared with the signal C$\underline{H}_2$OH of the free hydroxyl group of about 0.3 ± 0.03 ppm. Owing to long-range PH couplings, the signal C$\underline{H}_2$O—P is additionally split.
[c]TRIS = tris(hydroxymethyl)aminomethane.

A.2) Phosphonate Formation from Carboxylic Acids and Carboxylic Acid Derivatives with Aminoalkyl/Aryl Radicals The phosphonate formation from carboxylic acids or nitrites is achieved at high temperatures (140-150° C.) with pure phosphorous acid or with the aid of phosphorus halides (POCl₃, PCl₃, PBr₃) or HCl gas. Corresponding preparation processes are known (e.g. U.S. Pat. No. 4,239,695, U.S. Pat. No. 4,100,167, U.S. Pat. No. 3,799,758, U.S. Pat. No. 3,400,149, DE 21 30 794). Table 4 lists examples of industrially very particularly interesting phosphonate products which still have a free amino group.

TABLE 4

Phosphonate formation with the use of the industrially most relevant amino-containing starting compounds

| Starting material | Product and formula of phosphonate-containing amines |
|---|---|
| Glycine | 1-hydroxy-2-aminoethane 1,1-diphosphonate<br>H₂N—CH₂—C(OH)(PO₃H₂)(PO₃H₂) |
| β-Alanine | 1-hydroxy-3-aminopropane 1,1-diphosphonate<br>H₂N—CH₂CH₂—C(OH)(PO₃H₂)(PO₃H₂) |
| Iminodiacetonitrile | 2,2'-iminobis(1-aminoethane-1,1'-diphosphonate)<br>H₂N—C(PO₃H₂)(PO₃H₂)—CH₂—NH—CH₂—C(PO₃H₂)(PO₃H₂)—NH₂ |
| Iminodipropionitrile | 3,3'-iminobis(1-aminopropane-1,1'-diphosphonate) 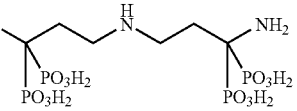 |

A.3) Amidation of Maleic Anhydride (MAA) with Phosphorus-Containing Aminoalkyl/Aryl Compounds 1 mol of an aminoalkyl/aryl phosphoric acid ester dissolved in 300 ml of water is adjusted to pH 5.5 with NaOH, and 1.0-2.5 mol of maleic anhydride (MAA), dissolved in 300 ml of dry acetone, are added with stirring. The rate of the MAA addition is chosen so that the pH of the reaction solution remains at 5.5-6.5 and the reaction temperature at 25° C. The pH is regulated with an NaOH solution. After the MAA addition, stirring is effected for a further 2 h at room temperature or—depending on reactivity and steric requirement of the amine—at a higher temperature. After the end of the reaction, the acetone is eliminated under reduced pressure and the solution is filtered. The aqueous monomer solution now present can be used directly for the copolymerization.

Examples of these novel phosphorus-containing MAA monomers, their yields and ¹H-NMR data are summarized in table 5.

TABLE 5

Yield and structural analysis of the phosphorus-containing MAA derivatives after the amidation of MAA with various phosphated aminoalkyl/aryl alcohols

| MAA (content) | MAA derivative of phosphorus-containing amine (1.0 eq.) | Yield of MAA-amide[a] | 1H-NMR (D₂O) of MAA-amide Chemical shifts[b] [δ, ppm] |
|---|---|---|---|
| 1.2 eq. | Aminoethanol phosphate (AE-P) | 98 ± 1% | 6.24 (d), 5.88 (d), 2H, C$\underline{H}$=C$\underline{H}$; 3.82 (q), 2H, C$\underline{H}_2$O—P; 3.37 (t), 2H, C$\underline{H}_2$NH(C=O) |
| 1.2 eq. | (Aminoethoxy) ethanol phosphate (AEE-P) | 91 ± 4% | 6.20 (d), 5.81 (d), 2H, C$\underline{H}$=C$\underline{H}$; 3.83 (q), 2H, C$\underline{H}_2$O—P; 3.58 (t), 3.53 (t), 4H, C$\underline{H}_2$OC$\underline{H}_2$; 3.29 (t), 2H, C$\underline{H}_2$N(CO) |
| 2.0 eq. | Aminohexanol phosphate (AHP) | 93% | 6.23 (d), 5.83 (d), 2H, C$\underline{H}$=C$\underline{H}$; 3.73 (q), 2H, C$\underline{H}_2$O—P; 3.11 (t), 2H, C$\underline{H}_2$NH(C=O); 1.6-1.2 (m), 8H, C$\underline{H}_2$ |

TABLE 5-continued

Yield and structural analysis of the phosphorus-containing MAA derivatives
after the amidation of MAA with various phosphated aminoalkyl/aryl alcohols

| MAA (content) | MAA derivative of phosphorus-containing amine (1.0 eq.) | Yield of MAA-amide[a] | 1H-NMR (D$_2$O) of MAA-amide Chemical shifts[b] [δ, ppm] |
|---|---|---|---|
| 1.2 eq. | Aminobenzyl alcohol phosphate (ABA-P) | n.d. | 6.26 (d), 5.92 (d), 2H, C$\underline{H}$=C$\underline{H}$; 4.70 (d), 2H, C$\underline{H}_2$O—P; 7.3-6.9 (m), 4H, phenyl |
| 2.0 eq. | Diethanolamine diphosphate (DEA-P2) | 95 ± 4% | 6.36 (d), 6.05 (d), 2H, C$\underline{H}$=C$\underline{H}$; 3.85 (m), 4H, C$\underline{H}_2$O—P; 3.57 (t), 4H, C$\underline{H}_2$NH(C=O) |

[a]The yield corresponds to the content of amidated MAA in comparison with unconverted amine and was determined with the aid of 1H-NMR (D$_2$O).
[b]The amidation of the MAA gives a typical splitting of the vinylic protons of the MAA (5.96 (s), 2H, C$\underline{H}$=C$\underline{H}$). In addition, a typical deep field shift of the proton signal C$\underline{H}_2$N(C=O) in comparison with the signal C$\underline{H}_2$NH of a free amino group of about 0.27 ± 0.07 ppm is obtained.

B.1) General Method for the Copolymerization Based on Phosphorus-Containing MAA Monomers, Poly(Alkylene Oxide)-Containing Alkenyl Ethers and Further Comonomers In a thermostattable double-walled reactor, 1.0 mol of as concentrated an aqueous solution as possible of vinyloxybutyl poly(ethylene glycol) ether (VOBPEG, e.g. M$_w$=500 g/mol) is initially taken and mixed with 1.0-1.7 mol of a 25% strength solution of phosphorus-containing MAA derivative (e.g. MAA-AEP) at pH>5 with stirring. Catalytic amounts of FeSO$_4$.7H$_2$O (0.05-0.5 mmol) and a 30% strength hydrogen peroxide solution (30-100 mmol) are added under nitrogen at 15° C. The polymerization is effected at pH>5 by uniform addition of a 3-10% strength solution of the reducing agent Brüggolit® (pH 5.0-6.3, from Brüggemann). The peroxide content is monitored and the polymerization is complete when the hydrogen peroxide has been completely consumed by the Brüggolit® (scheme 5). The composition and molar mass of this copolymer 1 (AEP-5) is shown in table 6.

The copolymerization can be varied and extended on the basis of the following examples:

(1) The poly(alkylene glycol)-containing alkenyl ethers may have different chain lengths (e.g. VOBPEG: 500, 1100, 2000 or 5800 g/mol) or may be mixtures of different chain length.
   Examples: Polymer 1, 2, 3, 4, 5, 10
(2) It is possible to use further phosphorus-containing MAA monomers, as described, for example, in tables 4 and 5.
   Examples: Polymer 1, 12, 14, 16, 17
(3) A variety of combinations of points (1) and (2) are possible.
   Examples: Polymer 13, 15, 18, 19, 20
(4) The poly(alkylene glycol)-containing alkenyl ethers can be substituted to a degree of 0-100 mol % by low molecular weight alkenyl ethers (e.g. n-hydroxybutyl monovinyl ether HBVE) and esters (e.g. vinyl acetate).
   Examples: Polymer 21, 22, 23, 24, 25, 26
(5) The phosphorus-containing MAA monomers can be substituted to a degree of 0-100 mol % by MAA and other MAA derivatives (e.g. N-hydroxyethylmaleimide MAI-HE).
   Examples: Polymer 27, 28, 29, 30
(6) Points (4) and (5) can likewise be combined.
   Examples: Polymer 31, 32
(7) It is possible to use 0-100 mol eq. of further comonomers which may be both neutrally charged, such as, for example, α,β-unsaturated hydroxyalkyl esters, such as hydroxypropyl acrylate (HPA) or hydroxyethyl methacrylate (HEMA), and of an ionic nature (anionic: e.g. acrylic acid, or cationic: e.g. vinyl-containing quaternary ammonium compounds).
   Examples: Polymer 6, 7, 8, 9, 11
(8) Points (3) and (6) can of course also be combined with point (7). The composition and molar masses of the phosphorus-containing copolymers mentioned are summarized in tables 6 and 7.

To emphasize the essential importance of the anionic phosphorus-containing groups in the polymers with regard to their use as cement-containing superplasticizers, copolymers of N-hydroxyethylmaleamide (MAA-AE) and VOBPEG, which have exclusively carboxylate charges on the polymer backbone, were synthesized. cf. examples: Polymer 33, 34

TABLE 6

Synthesis of virtually alternating copolymers by the polymerization of virtually
equimolar amounts of phosphorus-containing MAA monomers and PEG-containing vinyl
ethers and the synthesis of phosphorus-containing polymers by the copolymerization
of phosphorus-containing MAA derivatives and PEG-containing vinyl ethers with
water-soluble esters of the α,β-unsaturated carboxylic acids

| No. | P-containing MAA monomers (1.2 eq.) | VOBPEG[a] (1.0 eq.) M$_w$ (g/mol) | M$_w$ (g/mol) | Ratio | Comonomer (eq.) | | GPC data M$_w$ (g/mol) | M$_w$/M$_n$ |
|---|---|---|---|---|---|---|---|---|
| 1 | MAA-AE-P[b] | 500 | — | — | — | | 11,690 | 1.25 |
| 2 | " | 1100 | — | — | — | | 22,900 | 1.13 |
| 3 | " | 2000 | — | — | — | | 27,000 | 1.45 |
| 4 | " | 2000 | 500 | — | — | | 15,800 | 1.12 |
| 5 | " | 2000 | 500 | — | — | | 24,400 | 1.61 |
| 6 | " | 2000 | — | 1:2 | HPA[g] | 0.5 | 24,900 | 1.30 |
| 7 | " | 2000 | — | 2:1 | HPA | 1.0 | 40,200 | 1.65 |

TABLE 6-continued

Synthesis of virtually alternating copolymers by the polymerization of virtually equimolar amounts of phosphorus-containing MAA monomers and PEG-containing vinyl ethers and the synthesis of phosphorus-containing polymers by the copolymerization of phosphorus-containing MAA derivatives and PEG-containing vinyl ethers with water-soluble esters of the α,β-unsaturated carboxylic acids

| No. | P-containing MAA monomers (1.2 eq.) | VOBPEG[a] (1.0 eq.) $M_w$ (g/mol) | $M_w$ (g/mol) | Ratio | Comonomer | (eq.) | GPC data $M_w$ (g/mol) | $M_w/M_n$ |
|---|---|---|---|---|---|---|---|---|
| 8   | "              | 2000 | — |   | HPA     | 2.0 | 24,900 | 1.88 |
| 9   | "              | 2000 | — |   | HEMA[h] | 1.0 | 28,700 | 1.93 |
| 10  | "              | 5800 | — |   | —       |     | 26,300 | 1.32 |
| 11  | "              | 5800 | — |   | HPA     | 2.0 | 82,000 | 2.24 |
| 12  | MAA-AEE-P[c]   | 500  | — |   | —       |     | 16,200 | 1.25 |
| 13a | "              | 2000 | — |   | —       |     | 23,900 | 1.50 |
| 13b | "              | 2000 | — |   | —       |     | 23,050 | 1.21 |
| 14  | MAA-AH-P[d]    | 500  | — |   | —       |     | 20,900 | 1.46 |
| 15  | "              | 2000 | — |   | —       |     | 32,100 | 1.63 |
| 16  | MAA-ABA-P[e]   | 500  |   |   | —       |     | 26,200 | 1.64 |
| 17  | MAA-DEA-P2[f]  | 500  | — |   | —       |     | 13,400 | 1.32 |
| 18  | "              | 1100 | — |   | —       |     | 8,050  | 1.19 |
| 19  | "              | 2000 | — |   | —       |     | 13,400 | 1.32 |
| 20  | "              | 5800 | — |   | —       |     | 25,900 | 1.27 |

[a] VOBPEG = vinyloxybutylpoly(ethylene) glycol
[b] MAA-AE-P = N-(aminoethylphosphate)maleamide
[c] MAA-AEE-P = N-(2-aminoethoxyethylphosphate)maleamide
[d] MAA-AH-P = N-(aminohexylphosphate)maleamide
[e] MAA-ABA-P = N-(aminobenzyl alcohol phosphate)maleamide
[f] MAA-DEA-P2 = N-(diethanolamine diphosphate)maleamide
[g] HPA = hydroxypropyl acrylate
[h] HEMA = hydroxyethyl methacrylate

TABLE 7

Synthesis of virtually alternating phosphorus-containing copolymers by the polymerization of mixtures of MAA derivatives and vinyl ethers which contain phosphorus-containing MAA monomers and PEG-containing vinyl ethers

| No. | P-containing MAA monomers | MAA comonomers (1.2 eq.) | Ratio | VOBPEG[a] $M_w$ (g/mol) | Vinyl ether (1.0 eq.) | Ratio | GPC Data $M_w$ (g/mol) | $M_w/M_n$ |
|---|---|---|---|---|---|---|---|---|
| 21 | MAA-AE-P[b]  | —       | —   | 2000 | HBVE[c]  | 1:2 | 20,700 | 1.64 |
| 22 | "            | —       | —   | 2000 | HBVE     | 2:1 | 22,100 | 1.19 |
| 23 | "            | —       | —   | 5800 | HBVE     | 1:2 | 24,200 | 1.58 |
| 24 | "            | —       | —   | 5800 | HBVE     | 2:1 | 29,100 | 1.50 |
| 25 | MAA-DEA-P2[d]| —       | —   | 5800 | HBVE     | 1:2 | 25,056 | 1.37 |
| 26 | MAA-AE-P     | —       | —   | 2000 | TEGVE[e] | 1:1 | 21,300 | 1.21 |
| 27 | MAA-AE-P     | MAA     | 2:1 | 2000 | —        | —   | 33,800 | 1.62 |
| 28 | "            | "       | 1:2 | 2000 | —        | —   | 29,500 | 1.46 |
| 29 | MAA-AE-P     | MAI-HE[f]| 2:1| 2000 | —        | —   | 50,000 | 2.06 |
| 30 | "            | "       | 1:2 | 2000 | —        | —   | 60,600 | 2.28 |
| 31 | MAA-AE-P     | MAI-HE  | 1:1 | 2000 | HBVE     | 1:1 | 35,200 | 2.03 |
| 32 | "            | "       | 1:1 | 5800 | HBVE     | 1:1 | 46,000 | 1.61 |
| 33 | —            | MAA-AE[g]| —  | 500  | —        | —   | 11,500 | 1.98 |
| 34 | —            | MAA-AE  | —   | 2000 | —        | —   | 29,100 | 1.71 |

[a] VOBPEG = vinyloxybutylpoly(ethylene glycol) ether
[b] MAA-AE-P = N-(aminoethyl phosphate)maleamide
[c] HBVE = hydroxybutyl vinyl ether
[d] MAA-DEA-P2 = N-(diethanolamine diphosphate)maleamide
[e] TEGVE = triethylene glycol methyl vinyl ether
[f] MAI-HE = N-hydroxyethylmaleimide
[g] MAA-AE = N-aminoethylmaleamide

C) The Use of the Phosphorus-Containing Polymers as Water Reducers (Superplasticizers)

Determination of Water-Reducing Power, Retention of Flowability and Compressive Strengths in Mortar Mixes The tests were carried out according to the concrete standards DIN EN 206-1, DIN EN 12350-2 and DIN EN 12350-5. The cement used was a CEM I 42.5 R (Karlstadt). The aggregates for the mortar and concrete mixes are shown in table 8.

Mixing Sequence for Mortar Mix:

600 g of cement powder are homogenized in dry form and introduced into an RILEM mixer. Thereafter, the amount of water required for a W/C value is added and mixing is effected for 30 sec at 140 rpm (speed I). The sand mixture is then added with the aid of a funnel with the mixer running, and mixing is effected for a further 30 sec at 140 rpm (speed I). After a pause of 1.5 min in mixing and after the edges of the mixer have been cleaned, a corresponding amount of superplasticizer is added. Mixing is effected for a further 60 sec at 285 rpm (speed II) and the slump is then determined by tapping 10 times on a slump table with a Hägermann cone.

Mixing Sequence for Concrete Mix:

A 30 l mixer is used for the concrete mixes. 4.8 kg of cement and the corresponding amount of aggregates are premixed in dry form for 10 sec. Thereafter, 300 ml of the specified water are added, followed after a further 2 min of mixing by the amount of residual water required for the W/C value used. After a further 60 sec, the dissolved superplasticizer (0.2% by weight solid/cement) is added to the concrete mix and the mixing process is terminated after 60 sec with the determination of the slump.

TABLE 8

Formulations of the mortar and concrete mix for mortar and concrete tests

| Composition | Mortar test | | Concrete test | | |
|---|---|---|---|---|---|
| | S/C value[a] = 2.2 | Weight [g] | S/G value[b] = 0.48 | | Weight [kg/m³] |
| Aggregates | Quartz sand 30 | 178.2 | Quartz sand 0/0.5 | 3.3% | 60.9 |
| | Standard sand % 0/0.25 70% | 415.8 | Quartz sand 0/1.0 | 5.2% | 95.2 |
| | | — | Standard sand 0/4 | 39.4% | 738.6 |
| | | | Gravel 4/8 | 19.8% | 366.6 |
| | | | Gravel 8/16 | 32.4% | 602.8 |
| | | | Limestone flour | | 50.0 |
| Cement | CEM I 42.5R[c] | 270.0 | CEM I 42.5R[c] | | 320.0 |
| Superplasticizer[d] | (20% strength solution) | 2.7 | (20% strength solution) | | 3.2 |
| Water | | [e] | | | [e] |

[a]S/C value = sand/cement value = Σ sand [g] ÷ cement [g]
[b]S/G value = sand/sand-gravel value = Σ sand [g] ÷ (Σ sand [g] + Σ gravel [g])
[c]Origin of cement: Karlstadt (Germany)
[d]0.2% by mass of solid, based on cement
[e]The required amount of water is dependent on the set W/C value[f] corresponding to the superplasticizer used (tab. 9 and 10).
W/C value = water/cement value = Σ water [g] ÷ cement [g]

TABLE 9

Mortar test results and compressive strengths, ordered according to a) the best water-reducing power (W/C value) and b) the retention of flowability as a function of time (spread 0 and 90 min), i.e. the slump as far as possible unchanged after 90 min.

| Polymer No. | Dos.[a] | W/C value[b] | Slump[c] [cm] 0' | 30' | 60' | 90' | Fresh concrete density | Air pore content | Compressive strength [N/mm²] 1 d | 7 d | 28 d |
|---|---|---|---|---|---|---|---|---|---|---|---|
| Water | — | 0.57 | 24.7 | 23.4 | 23.0 | 22.5 | 2.162 | 1.5% | 20.3 | 42.8 | 45.8 |
| 33 | 0.25 | 0.49 | 22.4 | — | — | — | 2.230 | 3.0% | n.d. | — | — |
| 34 | 0.25 | 0.49 | 21.6 | — | — | — | 2.221 | 3.2% | n.d. | — | — |
| Water reducer (superplasticizer) | | | | | | | | | | | |
| Glenium 51 | 0.2 | 0.395 | 24.3 | 21.3 | 21.1 | 20.9 | 2.266 | 3.1% | 39.7 | 62.3 | 65.6 |
| 3 | 0.2 | 0.34 | 25.3 | 21.9 | 18.1 | — | 2.280 | 4.5% | 46.9 | 69.0 | 72.2 |
| 2 | 0.2 | 0.347 | 24.5 | 25.0 | 23.0 | 21.7 | 2.256 | 5.2% | 34.6 | 71.3 | 72.7 |
| 13a | 0.2 | 0.355 | 24.7 | 19.8 | — | — | 2.254 | 4.6% | 45.9 | 67.2 | 69.2 |
| 6 | 0.2 | 0.355 | 24.5 | 21.4 | — | — | 2.240 | 4.9% | 45.4 | 63.3 | 70.3 |
| 24 | 0.2 | 0.357 | 24.4 | 18.3 | — | — | 2.218 | 5.6% | 44.6 | 63.9 | 68.1 |
| 13b | 0.2 | 0.362 | 24.3 | 19.5 | — | — | 2.252 | 4.6% | 44.7 | 65.3 | 68.2 |
| 27 | 0.2 | 0.375 | 24.9 | 21.0 | — | — | 2.245 | 4.2% | 41.7 | 62.4 | 69.3 |
| 12 | 0.2 | 0.375 | 24.5 | 20.5 | — | — | 2.237 | 2.7% | 35.5 | 59.9 | 65.1 |
| 1 | 0.2 | 0.384 | 24.3 | 19.1 | — | — | 2.243 | 4.0% | 33.5 | 58.3 | 63.0 |
| 5 | 0.2 | 0.385 | 24.8 | 20.2 | — | — | 2.224 | 3.5% | n.d. | — | — |
| 22 | 0.2 | 0.385 | 24.1 | 21.6 | — | — | 2.219 | 3.9% | n.d. | — | — |
| 9 | 0.2 | 0.385 | 23.9 | 19.8 | — | — | 2.229 | 4.3% | 40.5 | 61.5 | 64.5 |

TABLE 9-continued

Mortar test results and compressive strengths, ordered according to a) the best water-reducing power (W/C value) and b) the retention of flowability as a function of time (spread 0 and 90 min), i.e. the slump as far as possible unchanged after 90 min.

| Polymer No. | Dos.[a] | W/C value[b] | Slump[c] [cm] 0' | 30' | 60' | 90' | Fresh concrete density | Air pore content | Compressive strength [N/mm$^2$] 1 d | 7 d | 28 d |
|---|---|---|---|---|---|---|---|---|---|---|---|
| 17 | 0.2 | 0.39 | 24.7 | 21.7 | — | — | 2.237 | 4.2% | 12.4 | 51.4 | 55.6 |
| 10 | 0.2 | 0.39 | 23.9 | 19.2 | — | — | 2.232 | 3.8% | 40.1 | 59.5 | 64.0 |
| 4 | 0.2 | 0.392 | 24.1 | 19.2 | — | — | 2.235 | 4.2% | 31.2 | 54.9 | 59.4 |
| 28 | 0.2 | 0.41 | 25.1 | 22.7 | — | — | 2.269 | 2.3% | 33.2 | 61.5 | 67.6 |
| 18 | 0.2 | 0.416 | 24.2 | 21.1 | — | — | 2.229 | 3.6% | 34.3 | 57.8 | 62.3 |
| 29 | 0.2 | 0.42 | 24.5 | 22.1 | — | — | 2.244 | 3.6% | n.d. | — | — |
| 23 | 0.2 | 0.42 | 24.6 | 20.7 | — | — | 2.236 | 3.0% | 34.7 | 56.4 | 59.3 |
| 26 | 0.2 | 0.422 | 24.6 | 21.2 | — | — | 2.224 | 3.2% | 32.1 | 61.9 | 69.7 |
| 21 | 0.2 | 0.425 | 24.5 | 23.5 | 22.7 | — | 2.215 | 4.0% | n.d. | — | — |
| 19 | 0.2 | 0.44 | 23.9 | 22.6 | — | — | 2.237 | 2.7% | 31.3 | 55.9 | 58.7 |
| 25 | 0.2 | 0.46 | 24.0 | 22.1 | — | — | 2.224 | 2.4% | 29.3 | 54.8 | 58.9 |
| 20 | 0.2 | 0.49 | 24.5 | 23.8 | — | — | 2.208 | 5.3% | 25.8 | 51.1 | 55.6 |
| 30 | 0.2 | 0.49 | 21.1 | — | — | — | 2.252 | 3.6% | n.d. | — | — |
| Water | — | 0.57 | 24.7 | 23.4 | 23.0 | 22.5 | 2.162 | 1.5% | 20.3 | 42.8 | 45.8 |
| 33 | 0.25 | 0.49 | 22.4 | — | — | — | 2.230 | 3.0% | n.d. | — | — |
| 34 | 0.25 | 0.49 | 21.6 | — | — | — | 2.221 | 3.2% | n.d. | — | — |
| | | | | Slump retainer | | | | | | | |
| Glenium 27 | 0.24 | 0.50 | 24.1 | 23.2 | 23.1 | 23.2 | 2.201 | 2.3% | 22.9 | 50.6 | 56.6 |
| 8 | 0.2 | 0.43 | 22.7 | 26.3 | 28.2 | 28.0 | 2.185 | 4.3% | 31.1 | 54.3 | 56.0 |
| 32 | 0.2 | 0.432 | 24.1 | 25.7 | 25.1 | 24.7 | 2.208 | 3.9% | 31.3 | 54.0 | 55.2 |
| 7[d] | 0.2 | 0.395 | 23.9 | 24.3 | 24.3 | 23.7 | 2.221 | 4.3% | 36.9 | 58.3 | 59.9 |
| 31 | 0.2 | 0.431 | 24.1 | 25.4 | 24.1 | 23.5 | 2.231 | 2.6% | 30.3 | 57.0 | 64.7 |
| 7[e] | 0.2 | 0.438 | 24.8 | 25.1 | 23.7 | 22.9 | 2.220 | 3.3% | 31.2 | 55.3 | 62.7 |
| | 0.25 | 0.415 | 24.7 | 25.5 | 24.8 | 23.6 | 2.226 | 3.1% | 34.9 | 56.7 | 59.0 |
| 14 | 0.2 | 0.427 | 24.2 | 24.9 | 23.5 | 22.4 | 2.245 | 3.9% | n.d. | — | — |

[a]Dos. = dose [% by mass of polymer, based on cement]
[b]W/C value = water/cement value: indicates the amount of water required for producing a flowable mortar at a constant amount of cement.
[c]Slump, determined after 0, 30, 60 and 90 min.
[d]Purified sample: ultrafiltration using a 10 kDa membrane
[e]Unfiltered sample: at a solids content of 100%, about 79% of polymeric product and 21% of low molecular weight constituents < 5000 g/mol, such as, for example, residual monomers, salts, etc. are present after the polymerization.

TABLE 10

Concrete tests (water-reducing power, slump retention and compressive strengths): a) ordered according to the best water-reducing power (W/C value) and b) the retention of flowability as a function of time (slump retention)

| Polymer No. | Dos.[a] | W/C value | Slump[b] [cm] 0' | 10' | 40' | 60' | 90' | Fresh concrete density | Air pore content | Compressive strength [N/mm$^2$] 1 d | 7 d | 28 d |
|---|---|---|---|---|---|---|---|---|---|---|---|---|
| Water | — | 0.63 | 59.0 | 60.5 | 57.5 | 57.5 | 55.0 | 2.389 | 2.4% | 15.4 | 36.5 | 42.9 |
| | | | | | Water reducer | | | | | | | |
| Glenium 51 | 0.2 | 0.49 | 59.5 | 60.5 | 57.5 | 56.0 | 51.0 | 2.477 | 1.8% | 33.0 | 55.5 | 65.3 |
| 3 | 0.2 | 0.42 | 55.0 | 47.5 | 36.5 | — | — | 2.462 | 3.0% | 42.4 | 63.8 | 70.0 |
| 2 | 0.2 | 0.44 | 50.0 | 42.5 | 36.5 | — | — | 2.440 | 2.4% | 36.4 | 60.3 | 69.4 |
| 24 | 0.2 | 0.44 | 56.5 | 46.0 | 36.5 | — | — | 2.432 | 2.1% | 35.2 | 57.5 | 64.0 |
| 13a | 0.2 | 0.45 | 57.5 | 52.0 | 45.0 | 42.0 | — | 2.442 | 2.1% | 38.2 | 58.1 | 66.5 |
| 13b | 0.2 | 0.46 | 60.0 | 54.0 | 47.5 | 42.0 | — | 2.429 | 1.7% | 36.0 | 59.8 | 66.8 |
| 6 | 0.2 | 0.46 | 60.5 | 58.0 | 57.0 | 55.5 | 52.5 | 2.429 | 1.5% | 31.6 | 58.9 | 68.1 |
| 5 | 0.2 | 0.47 | 58.0 | 48.5 | 40.5 | 40.0 | — | 2.459 | 2.5% | 31.9 | 56.3 | 62.9 |
| 27 | 0.2 | 0.47 | 58.0 | 56.0 | 50.5 | 47.0 | 41.5 | 2.421 | 1.8% | 31.1 | 54.5 | 62.7 |
| 10 | 0.2 | 0.48 | 58.0 | 50.0 | 43.0 | 41.4 | — | 2.428 | 1.8% | 31.4 | 53.0 | 60.5 |
| 22 | 0.2 | 0.48 | 61.0 | 52.0 | 41.0 | — | — | 2.454 | 2.6% | 28.8 | 54.0 | 62.7 |
| 1 | 0.2 | 0.49 | 63.0 | 56.5 | 49.5 | 47.5 | 43.0 | 2.425 | 1.6% | 26.6 | 51.9 | 60.1 |
| 4 | 0.2 | 0.49 | 58.5 | 51.0 | 46.0 | 45.0 | 42.5 | 2.412 | 2.4% | 25.1 | 52.0 | 60.9 |
| 17 | 0.2 | 0.49 | 57.0 | 54.5 | 49.0 | 47.5 | 46.0 | 2.408 | 1.9% | 26.1 | 56.3 | 62.0 |
| 18 | 0.2 | 0.50 | 58.0 | 53.5 | 48.0 | 48.0 | 45.5 | 2.423 | 1.7% | 25.6 | 51.0 | 58.5 |
| 9 | 0.2 | 0.50 | 62.5 | 60.0 | 55.0 | 51.5 | 49.0 | 2.428 | 1.3% | 29.3 | 54.6 | 60.8 |
| 21 | 0.2 | 0.51 | 57.5 | 53.0 | 48.0 | 46.0 | — | 2.439 | 2.2% | 23.0 | 48.9 | 54.2 |
| 23 | 0.2 | 0.51 | 62.0 | 53.5 | 48.0 | 46.0 | 41.5 | 2.425 | 1.7% | 24.8 | 47.9 | 55.6 |
| 26 | 0.2 | 0.51 | 61.5 | 56.0 | 50.5 | 47.5 | 44.0 | 2.415 | 2.0% | 21.7 | 50.0 | 55.3 |

TABLE 10-continued

Concrete tests (water-reducing power, slump retention and compressive strengths):
a) ordered according to the best water-reducing power (W/C value) and b) the
retention of flowability as a function of time (slump retention)

| Polymer No. | Dos.[a] | W/C value | Slump[b] [cm] 0' | 10' | 40' | 60' | 90' | Fresh concrete density | Air pore content | Compressive strength [N/mm$^2$] 1 d | 7 d | 28 d |
|---|---|---|---|---|---|---|---|---|---|---|---|---|
| 31 | 0.2 | 0.51 | 56.5 | 57.0 | 53.0 | 49.0 | 45.0 | 2.421 | 1.8% | 21.6 | 46.7 | 54.2 |
| 7[d] | 0.2 | 0.52 | 61.0 | 60.0 | 59.0 | 54.5 | 50.5 | 2.384 | 1.9% | 21.0 | 45.2 | 52.0 |
| 14 | 0.2 | 0.52 | 59.5 | 58.0 | 54.5 | 52.0 | 49.0 | 2.455 | 2.0% | 21.1 | 47.3 | 55.7 |
| 29 | 0.2 | 0.53 | 59.0 | 56.0 | 54.0 | 54.0 | 51.5 | 2.440 | 2.1% | 21.3 | 47.2 | 57.4 |
| 11 | 0.2 | 0.54 | 60.5 | 59.0 | 56.0 | 48.0 | 45.5 | 2.387 | 1.6% | 19.2 | 41.7 | 51.2 |
| Water | — | 0.63 | 59.0 | 60.5 | 57.5 | 57.5 | 55.0 | 2.389 | 2.4% | 15.4 | 36.5 | 42.9 |
| Slump retainer | | | | | | | | | | | | |
| Glenium 27 | 0.24 | 0.56 | 58.5 | 62.0 | 61.5 | 62.0 | 59.5 | 2.434 | 0.9% | 19.7 | 46.0 | 54.8 |
| 8 | 0.2 | 0.53 | 61.0 | 62.5 | 64.5 | 64.0 | 62.0 | 2.434 | 1.4% | 22.4 | 50.9 | 60.1 |
| 32 | 0.2 | 0.53 | 60.0 | 63.0 | 62.0 | 60.5 | 58.0 | 2.394 | 1.5% | 22.7 | 48.1 | 55.7 |
| 7[c] | 0.2 | 0.49 | 59.5 | 60.0 | 62.0 | 60.0 | 56.0 | 2.413 | 1.6% | 28.2 | 53.3 | 63.7 |
| 28 | 0.2 | 0.52 | 58.0 | 57.5 | 60.0 | 59.0 | 54.0 | 2.416 | 1.7% | 24.4 | 52.1 | 59.2 |
| 19 | 0.2 | 0.53 | 59.0 | 57.0 | 55.5 | 55.5 | 54.0 | 2.413 | 1.2% | 23.8 | 50.4 | 59.1 |
| 30 | 0.2 | 0.59 | 58.5 | 57.0 | 56.0 | 55.0 | 53.5 | 2.410 | 2.3% | 13.8 | 40.5 | 47.9 |
| 20 | 0.2 | 0.57 | 61.5 | 59.5 | 58.5 | 57.0 | 55.5 | 2.397 | 1.3% | 19.1 | 44.3 | 49.3 |

[a]Dos. = dose [% by mass of polymer, based on cement]
[b]Slump, determined after 0, 10, 40, 60 and 90 min.
[c]Purified sample: ultrafiltration using a 10 kDa membrane
[d]Unfiltered sample: at a solids content of 100%, about 79% of polymeric product and 21% of low molecular weight constituents < 5000 g/mol, such as, for example, residual monomers, salts, etc., are present after the polymerization.

The invention claimed is:

1. A copolymer comprising a phosphorus-containing monomer (A) of unsaturated dicarboxylic acid derivatives of the formulae (Ia) or (Ib)

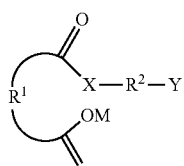

(Ia)

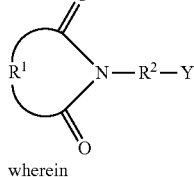

(Ib)

wherein $R^1$ is

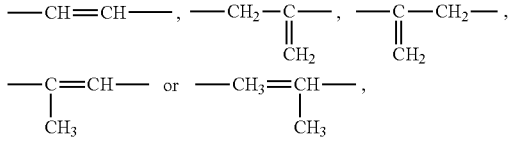

X is O, S, NH or N—$R^2$—Y;

$R^2$ is a linear or branched $C_1$-$C_{20}$-(hetero)alkylene radical, optionally having an O or N heteroatom and optionally also have 1 to 10 substituents selected from the group consisting of OH, $OPO_3M_2$, $OPHO_2M$, $NH_2$, NH—$CH_2PO_3M_2$, $N(CH_2$—$PO_3M_2)_2$, $CZ(PO_3M_2)_2$, and $C_6$-$C_{10}$-arylene radicals;

Y is —$N(CH_2$—$PO_3M_2)_2$, —$CZ(PO_3M_2)_2$, —$OPHO_2M$ or —$OPO_3M_2$;

Z is H, Hal, OH or $NH_2$;

Hal is F, Cl, Br, I;

M is H, Na, K, $NH_4$ or $N(R^3)_4$;

$R^3$ is a $C_1$-$C_{12}$-alkyl radical or a $C_6$-$C_{10}$-aryl radical; and a macromonomer (B) of formula (II)

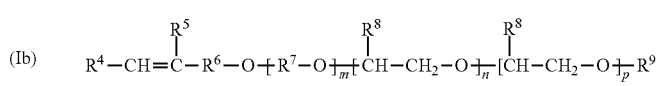

(II)

wherein $R^4$ is H or a $C_1$-$C_{20}$-alkyl radical;

$R^5$ is H or $CH_3$;

$R^6$ is a single bond or an alkylene radical having from 1 to 20 C atoms;

$R^7$ is a $C_1$-$C_{20}$-alkylene radical;

$R^8$ is H or a $C_1$-$C_{20}$-alkyl radical;

$R^9$ is H, a $C_1$-$C_{20}$-alkyl radical, a $C_6$-$C_{10}$-aryl radical, $COR^3$, $NO_2M$, $SO_3M$, or $PO_3M_2$:

m is 0 to 10;

n is 1 to 300;

p is from 0 to 300;

and $R^3$ and M are as defined above.

2. A copolymer as claimed in claim 1, further comprises a building block based on a monomer (C) according of formulae (IIIa) or (IIIb)

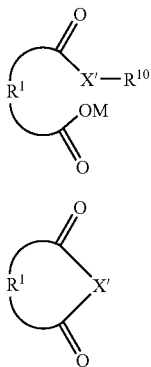

(IIIa)

(IIIb)

wherein

X' is O, S, NH or $NR^{10}$;

$R^{10}$ is H, a $C_1$-$C_{20}$-(hetero)alkyl radical optionally having a O or N heteroatom, which are linear or branched and optionally have 1 to 10 OH or $NH_2$, or a combination thereof, and a $C_6$-$C_{10}$-aryl radical; and $R^1$ and M are as described above.

3. The copolymer as claimed in claim 1, wherein the copolymers further comprises a building block based on the monomer (D) having the formula (IV)

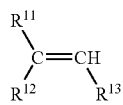

(IV)

wherein $R^{11}$ is H, $R^{10}$, $(CH_2)_rOR^{10}$ or $O(C=O)R^{10}$;

$R^{12}$ and $R^{13}$ are H, a $C_1$-$C_{20}$-alkyl radical or a $C_6$-$C_{10}$-aryl radical;

r is from 0 to 10; and $R^{10}$ is H, a $C_1$-$C_{20}$-(hetero)alkyl radical optionally having a O or N heteroatom, which are linear or branched and optionally have 1 to 10 OH or $NH_2$, or a combination thereof, and a $C_6$-$C_{10}$-aryl radical.

4. The copolymer as claimed in claim 2, wherein the copolymers further comprises a building block based on monomer (D) having the formula (IV)

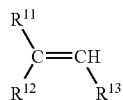

(IV)

wherein $R^{11}$ is H, $R^{10}$, $(CH_2)_rOR^{10}$ or $O(C=O)R^{10}$;

$R^{12}$ and $R^{13}$ are H, a $C_1$-$C_{20}$-alkyl radical or a $C_6$-$C_{10}$-aryl radical;

r is from 0 to 10; and $R^{10}$ is as defined above.

5. The copolymer as claimed in any of claim 1, further comprising a building block based on monomer (E) having the formula (V)

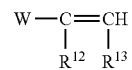

(V)

wherein

W is CN or CO—$R^{14}$;

$R^{14}$ is H, OM, $OR^{10}$, $NHR^{10}$, $N(R^{10})_2$, or $SR^{10}$;

$R^{10}$ is H, a $C_1$-$C_{20}$-(hetero)alkyl radical optionally having a O or N heteroatom, which are linear or branched and optionally have 1 to 10 OH or $NH_2$, or a combination thereof, and a $C_6$-$C_{10}$-aryl radical;

$R^{12}$ and $R^{13}$ are H, a $C_1$-$C_{20}$-alkyl radical or a $C_6$-$C_{10}$-aryl radical;

M is H, Na, K, $NH_4$ or $N(R^3)_4$; and $R^3$ is a $C_1$-$C_{12}$-alkyl radical or a $C_6$-$C_{10}$-aryl radical.

6. The copolymer as claimed in any of claim 2, further comprising a building block based on monomer (E) having the formula (V)

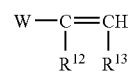

(V)

wherein

W is CN or CO—$R^{14}$;

$R^{14}$ is H, OM, $OR^{10}$, $NHR^{10}$, $N(R^{10})_2$, or $SR^{10}$;

$R^{10}$ is H, a $C_1$-$C_{20}$-(hetero)alkyl radical optionally having a O or N heteroatom, which are linear or branched and optionally have 1 to 10 OH or $NH_2$, or a combination thereof, and a $C_6$-$C_{10}$-aryl radical;

$R^{12}$ and $R^{13}$ are H, a $C_1$-$C_{20}$-alkyl radical or a $C_6$-$C_{10}$-aryl radical;

M is H, Na, K, $NH_4$ or $N(R^3)_4$; and $R^3$ is a $C_1$-$C_{12}$-alkyl radical or a $C_6$-$C_{10}$-aryl radical.

7. The copolymer as claimed in any of claim 3, further comprising a building block based on monomer (E) having the formula (V)

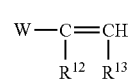

(V)

wherein

W is CN or CO—$R^{14}$;

$R^{14}$ is H, OM, $OR^{10}$, $NHR^{10}$, $N(R^{10})_2$, or $SR^{10}$;

$R^{10}$ is H, a $C_1$-$C_{20}$-(hetero)alkyl radical optionally having a O or N heteroatom, which are linear or branched and optionally have 1 to 10 OH or $NH_2$, or a combination thereof, and a $C_6$-$C_{10}$-aryl radical;

$R^{12}$ and $R^{13}$ are H, a $C_1$-$C_{20}$-alkyl radical or a $C_6$-$C_{10}$-aryl radical;

M is H, Na, K, $NH_4$ or $N(R^3)_4$; and $R^3$ is a $C_1$-$C_{12}$-alkyl radical or a $C_6$-$C_{10}$-aryl radical.

8. The copolymer as claimed in any of claim 1, wherein the molar ratio of monomer (A) to monomer (B) in the copolymer is from 2:1 to 1:2.

9. The copolymer as claimed in claim 1, wherein up to 90 mol % of monomer (A) are replaced by monomer (C).

10. The copolymer as claimed in claim 1, wherein up to 90 mol % of the monomer (B) are replaced by the monomer (D).

11. The copolymer as claimed in claim 1, wherein up to 90 mol % of the monomers (A) and (B) are replaced by the monomers (C) and (D).

12. The copolymer as claimed in claim 4 wherein the copolymer contains up to 10 mol equivalents of monomer (E) based on the sum of the monomers (A) and (B).

13. A process for the preparation of the copolymer of claim 1 by subjecting the monomers (A) and (B) to a free radical polymerization.

14. The process as claimed in claim 13, wherein the free radical polymerization is carried out in an aqueous system in the temperature range from −10 to 100° C.

15. The process as claimed in claim 13 wherein free radicals are produced by thermal decomposition of a suitable peroxo or an azo initiator, photochemically or by use of a redox system.

16. The process as claimed in claim 15, wherein azo initiator is water soluble.

17. The process as claimed in claim 13, wherein the free radical polymerization is carried out with the aid of a redox system consisting of hydrogen peroxide, iron(II) sulfate and a reducing agent in the temperature range from 0 to 30° C.

18. The process as claimed in claim 13, wherein the photochemical or redox free radical production is effected at temperatures from 0 to 30° C.

19. An admixture comprising the copolymer of claim 1 and an inorganic binder suspension comprising cement, lime, gypsum or anhydrite.

20. The admixture of claim 19, wherein the copolymer is present in an amount of from 0.01 to 10% by weight, based on the weight of the inorganic binder.

21. The admixture of claim 19, wherein the copolymer is present in an amount sufficient to be a superplasticizer or a water reducer.

* * * * *